United States Patent
Tajima et al.

(10) Patent No.: US 7,656,566 B1
(45) Date of Patent: Feb. 2, 2010

(54) IMAGE PROCESSING APPARATUS

(75) Inventors: Katsuaki Tajima, Toyokawa (JP);
Takayuki Nabeshima, Toyokawa (JP);
Junji Nishigaki, Toyokawa (JP); Toshio Tsuboi, Okazaki (JP); Daisetsu Tohyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 697 days.

(21) Appl. No.: 09/656,440

(22) Filed: Sep. 6, 2000

(30) Foreign Application Priority Data

Sep. 10, 1999 (JP) ................................. 11-256856

(51) Int. Cl.
*G03F 3/08* (2006.01)
*H04N 1/46* (2006.01)

(52) U.S. Cl. ...................................... 358/518; 358/501

(58) Field of Classification Search .................. 358/1.9, 358/1.1, 1.11–1.18, 1.2, 3.01, 3.26, 500–502, 358/539, 517–522; 382/166, 167, 162, 518; 345/30, 590, 604; 399/28, 39

See application file for complete search history.

(56) References Cited

U.S. PATENT DOCUMENTS

| | | | | |
|---|---|---|---|---|
| 5,627,995 A | * | 5/1997 | Miller et al. | 711/171 |
| 5,828,780 A | * | 10/1998 | Suzuki et al. | 382/167 |
| 5,884,120 A | * | 3/1999 | Ito et al. | 399/54 |
| 6,016,359 A | * | 1/2000 | Komatsu | 382/162 |
| 6,266,152 B1 | | 7/2001 | Nakajima | |
| 6,344,908 B1 | | 2/2002 | Aritomi | |

FOREIGN PATENT DOCUMENTS

| | | |
|---|---|---|
| JP | 5-167839 | 7/1993 |
| JP | 7-287748 | 10/1995 |
| JP | 8-111786 | 4/1996 |
| JP | 9-214790 | 8/1997 |
| JP | 9-270928 | 10/1997 |
| JP | 9-270929 | 10/1997 |
| JP | 9-312777 | 12/1997 |

* cited by examiner

*Primary Examiner*—Thierry L Pham
(74) *Attorney, Agent, or Firm*—McDermott Will & Emery LLP

(57) ABSTRACT

An image processing apparatus for outputting an image by a printer or a display is provided, in which color reproducibility in the image output of plural pages becomes uniform. The apparatus comprises an image memory for memorizing image data of all pages of one output job that is given to an output device, decision portion for deciding whether the image data of all pages are data within a color reproduction range of the output device or not. A color compression process is performed for the image data of all pages uniformly only when it is decided that the image data of all pages are not data within the color reproduction range of the output device.

6 Claims, 3 Drawing Sheets

IMAGE PROCESSING APPARATUS

This application is based on Japanese Patent Application No. 256856/1999 filed on Sep. 10, 1999, the contents of which are incorporated herein by reference.

BACKGROUND OF THE INVENTION

1. Field of the Invention

The present invention relates to an image processing apparatus for outputting an image by a printer or a display.

2. Description of the Prior Art

When printing out an image read by a color scanner or a computer graphics, a color compressing process is performed as necessary, in which colors of the image data are converted into colors within a color reproduction range of the printer.

Conventionally, it is decided whether a color compression process is necessary or not for each page, and a color compressing process is performed for the pages that require the color compression in accordance with the decision result.

For example, concerning copies of plural color originals, the color compression is performed for some originals, while it is not performed for other originals. In this case, there was a problem that the states of color reproduction of copies are not uniform among the originals. It is considered to decide whether the color compression is necessary or not for the first original, and to adopt the decision result to all of the originals. In this case, the color compression cannot be performed for originals that need the color compression. In general, if the color compression is not performed for originals that need the color compression, the influence is larger than the case where the color compression is performed for originals that do not need the color compression.

SUMMARY OF THE INVENTION

The object of the present invention is to make the color reproducibility uniform in the image output of plural pages.

An image processing apparatus according to the present invention comprises a decision controller for deciding whether plural pages of image data included in the job are data within a color reproduction range of the output device or not, and a color compressing controller for performing a color compression process uniformly to all of the plural pages of image data in accordance with the decision of the decision controller so as to supply the processed data to the output device.

An image processing method according to the present invention comprises a decision step of deciding whether plural pages of image data included in the job are data within a color reproduction range of the output device or not, and a color compression step of performing a color compression process uniformly to all of the plural pages of image data in accordance with a decision in the decision step so as to supply the processed data to the output device.

DESCRIPTION OF THE PREFERRED EMBODIMENTS

Hereinafter, the present invention will be explained more in detail with reference to embodiments and drawings.

Figure 1:
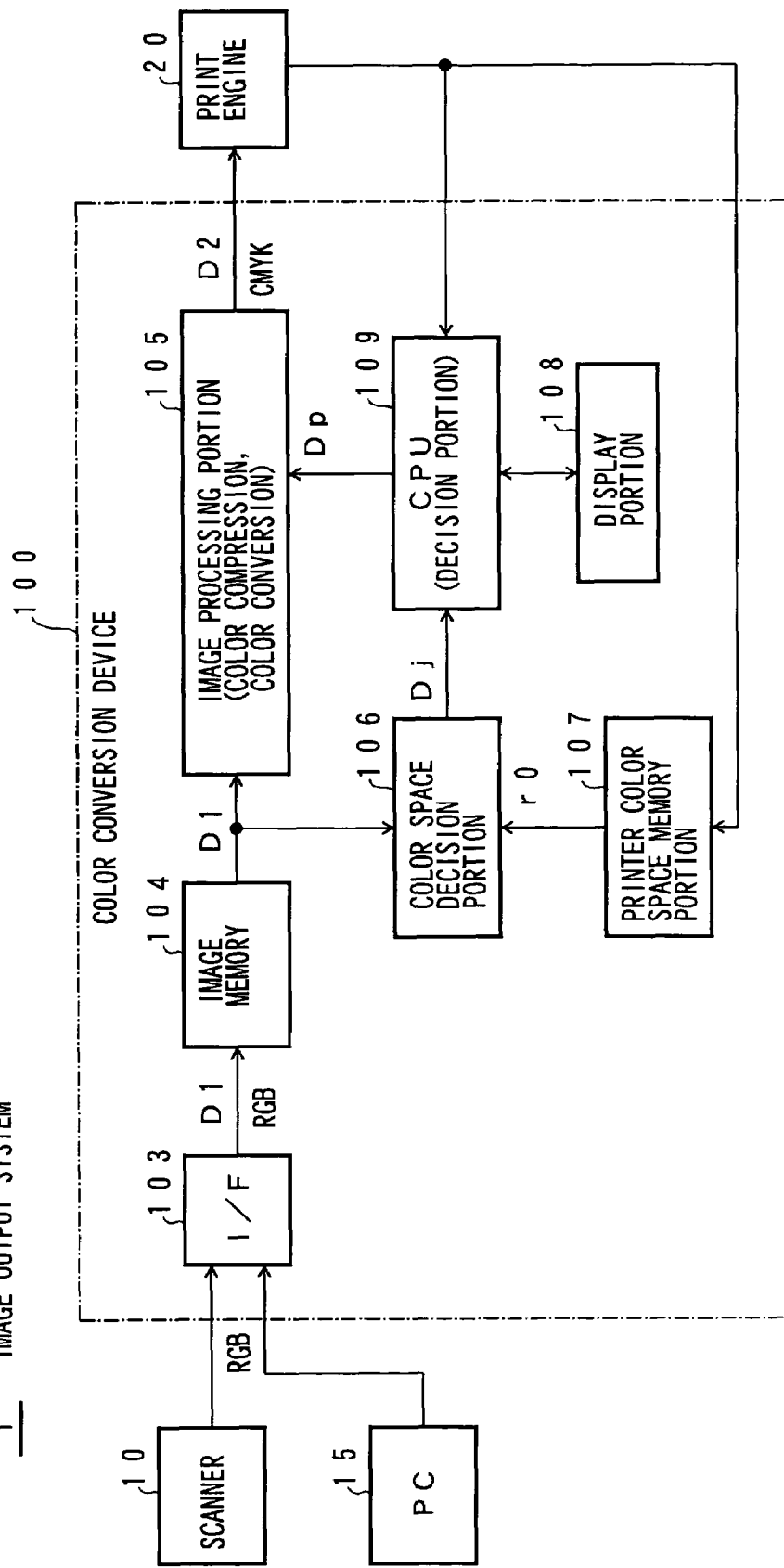
FIG. 1 is a block diagram showing a general structure of an image output system according to the present invention.

FIG. 1 is a block diagram showing a general structure of an image output system according to the present invention.

The image output system 1 comprises a scanner 10 that reads an original by decomposing its color into three colors, i.e., red (R), green (G) and blue (B), a print engine 20 that prints a color image, a color conversion device 100 and a computer 15 that issues a print job. More specifically, the image output system 1 can take the form of a computer system including a color printer with a print engine 20 and an image reader with a scanner 10, or a combination machine thereof. The image output system 1 is used for printing a document generated by the computer 15 or for copying the original. The color conversion device 100 is built in the color printer or the image reader. Otherwise, it is used as a stand-alone apparatus connected by a cable.

In a copying operation of plural originals, the scanner 10 reads sequentially the plural originals set on a table of original and sends the image data to the color conversion device 100. The computer 15 sends the image data to a color conversion device 100, when printing plural pages of a document.

An input interface 103 of the color conversion device 100 selects the scanner 10 or the computer 15 as an input device and sends image data D1 from the input device to an image memory 104. The image memory 104 memorizes all image data D1 concerning one output job (a copy job or a print job). In parallel with this memorizing process, the image data D1 of each page are sent from the image memory 104 to a color space decision portion 106 sequentially. The color space decision portion 106 is supplied with data that show the current printer color reproduction range r0 from a printer color space memory portion 107.

The color space decision portion 106 decides whether a color range of the image data D1 of each page exceeds the printer color reproduction range r0 or not. The detail of the decision process will be described later. In accordance with the decision result Dj, a CPU 109 sets a parameter Dp that defines contents of the process for an image processing portion 105. The image processing portion 105 can perform a color conversion from RGB to CMYK, an image quality improving process such as a γ correction or an edge emphasis and a color compression process for the image data D1 that were read out of the image memory 104. The image data D2 after the image processing are sent to the print engine 20.

Since the CPU 109 sets the parameter for each job, the color compression is not performed for the image data D1 of all pages of one job, or the color compression is performed for the image data D1 over all pages of one job. However, it is possible to provide an input key to a display portion 108 for displaying a state, so that a user can designate necessity or not necessity of the color compression for each page.

Figure 2:
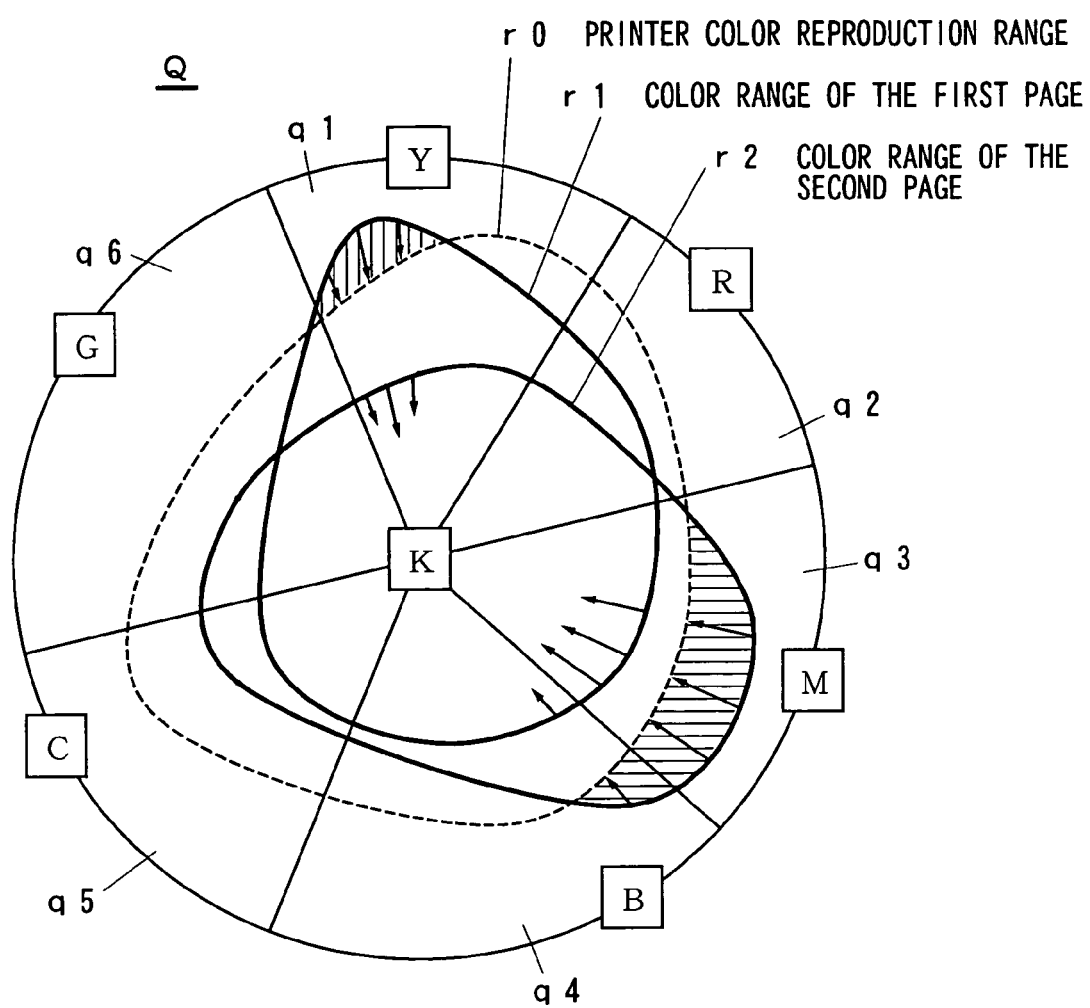
FIG. 2 is a schematic diagram of the color compression.

FIG. 2 is a schematic diagram of the color compression.

The above-mentioned color space decision portion 106 converts the RGB image data D1 to a standard color space (e.g., a CIELAB color space) data and decides whether the pixel color of each page is a color within the printer color reproduction range r0 or not for each of a predetermined number (six in this example) of blocks q1-q6 of the standard color space Q that was divided by the tint. Then, the color space decision portion 106 sends the data that indicate the ratio of the number of the pixels outside the printer color reproduction range to that of each of the blocks q1-q6 (the ratio of areas) as the decision result Dj to the CPU 109. The CPU 109 memorizes the decision result Dj that was sent page by page, decides necessity or not necessity of the color compression for each block in accordance with the decision result Dj of one job, and calculates the parameter Dp, which is given to the image processing portion 105. In the example of FIG. 2, the color range r1 of the first page is out of the printer color reproduction range r0 in the block q1. In addition, the color range r2 of the second page is out of the printer color reproduction range r0 in the blocks q3 and q4. In this case, the image processing portion 105 performs the color compression for converting the color of the portion corresponding to the block q1 of the image data D1 of the first page into the color within the printer color reproduction range r0 as shown by the arrows in the figure, and performs the color compression for the blocks q3 and q4, too. In the same way, the image processing portion 105 performs the color compression of the image data D1 of the second page for the blocks q3 and q4 and performs the color compression for the block q1, too.

Figure 3:
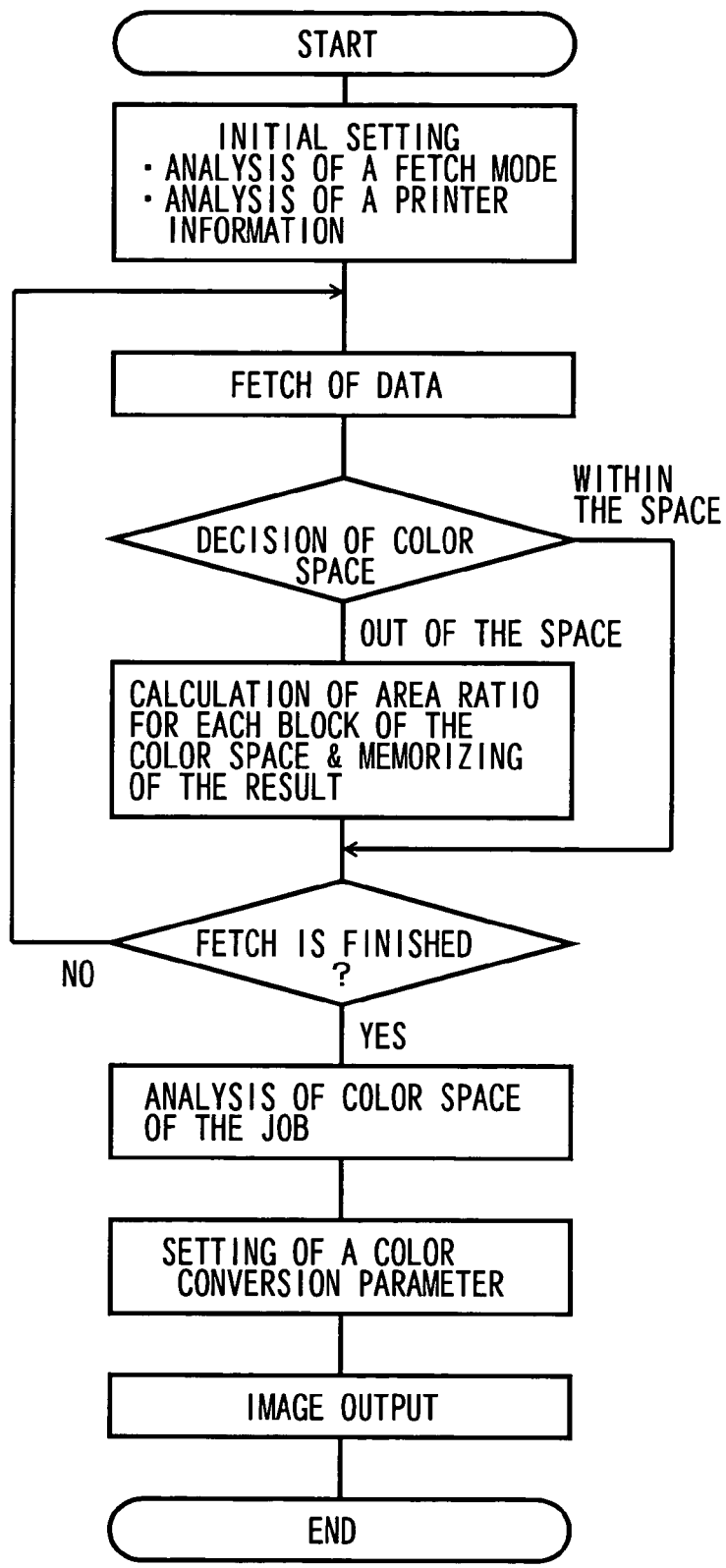
FIG. 3 is a flow chart showing a general operation of the color conversion device.

FIG. 3 is a flow chart showing a general operation of the color conversion device.

After analyzing a fetch mode and printer information in accordance with a communication result with the input device and the output device, fetching of the image data from the input device is started (#1, #2). Concerning the image data of one page, the above-mentioned area ratio is calculated for each block of the color space (#3, #4). The area ratio is calculated for the image data of all pages of one job (#5), necessity or not necessity of the color compression is decided for each block in accordance with the cumulative value of the area ratio of all pages (#6), a parameter for adding a necessary image process to the image data D1 is set (#7), and the image process is started for outputting the image data D2 (#8).

In the above-mentioned embodiment, the kind and the number of the input device and the output device are not limited to the illustrated example. In the case of plural output devices, it can be possible that the user selects one output device by the display portion 108. The division number of the color space Q is not limited to six. It is possible to decide necessity or not necessity of the color compression without dividing the color space Q.

According to the present invention, the color reproducibility in the image output of plural pages can be made uniform.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processing apparatus for processing plural pages of a job to be give to an output device, each page of the plural pages having a predetermined number of sections of standard color space, the image processing apparatus comprising:
   a memory for memorizing all of the plural pages of the job;
   a determiner for determining whether or not image data on said each page are within a color reproduction range of the output device, wherein the determining determines a number of results equal to the number of the plural pages;
   a decision controller for deciding parameters to be used for color correction for the job based on the results; and
   a color compressing controller for compressing uniformly all of said plural pages using the same parameters which are decided for the job so as to supply the compressed plural pages to the output device.

2. The image processing apparatus according to claim 1, wherein the output device is a printer for printing an image in accordance with the image data, and the image processing apparatus is built in the printer.

3. The image processing apparatus according to claim 1, wherein the image data are generated by an image reader, and the image processing apparatus is built in the image reader.

4. The image processing apparatus according to claim 1, wherein the decision controller performs the deciding for each section of the standard color space for the parameters to be used for color correction, and the compressing controller performs a color compression uniformly for each section of standard color space.

5. A method for processing plural pages of a job to be given to an output device, the method comprising steps of:
   providing a memory for memorizing all of the plural pages of the job;
   determining whether or not image data on each page of the plural pages are within a color reproduction range of the output device, wherein the determining determines a number of results equal to the number of the plural pages; and
   deciding parameters to be used for color correction for the job based on the results; and
   compressing uniformly all of said plural pages using the same parameters which are decided for the job so as to supply the compressed plural pages to the output device.

6. The method according to claim 5, wherein the deciding step is performed for each section of standard color space, and the compressing step performs the color compression uniformly for each section of standard color space.

* * * * *

UNITED STATES PATENT AND TRADEMARK OFFICE
CERTIFICATE OF CORRECTION

PATENT NO. : 7,656,566 B1 Page 1 of 1
APPLICATION NO. : 09/656440
DATED : February 2, 2010
INVENTOR(S) : Tajima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Thirtieth Day of November, 2010

David J. Kappos
*Director of the United States Patent and Trademark Office*